United States Patent [19]
Ruckgaber

[11] Patent Number: 4,592,032
[45] Date of Patent: May 27, 1986

[54] METHODS OF PROCESSING GEOPHYSICAL DATA AND DISPLAYS OF GEOPHYSICAL DATA

[75] Inventor: Gary M. Ruckgaber, Tulsa, Okla.

[73] Assignee: Standard Oil Company (Indiana), Chicago, Ill.

[21] Appl. No.: 614,348

[22] Filed: May 24, 1984

Related U.S. Application Data

[63] Continuation of Ser. No. 231,699, Feb. 5, 1981, abandoned.

[51] Int. Cl.$^4$ .............................................. G01V 1/00
[52] U.S. Cl. ........................................ 367/73; 73/156
[58] Field of Search ................ 364/421, 422; 367/19, 367/21, 50, 51, 54, 58, 73, 124, 127, 907; 73/1 DV, 600, 602, 156

[56] References Cited

U.S. PATENT DOCUMENTS

| | | |
|---|---|---|
| 3,214,700 | 10/1965 | Hook ................................. 367/125 |
| 3,284,765 | 11/1966 | Bratton et al. ...................... 367/54 |
| 3,500,543 | 3/1970 | Quarles, Jr. ...................... 367/57 X |
| 3,569,920 | 3/1971 | Antman ............................ 367/127 |
| 3,864,667 | 2/1975 | Bahjat .............................. 367/48 |
| 3,924,450 | 12/1975 | Uchiyama et al. ............. 367/907 X |
| 3,962,671 | 6/1976 | Jilling ........................... 73/1 DV X |
| 3,985,024 | 10/1976 | Horak ............................ 367/907 X |
| 4,240,281 | 12/1980 | Lather et al. ..................... 73/1 DV |
| 4,323,990 | 4/1982 | Goode et al. ...................... 367/21 X |

OTHER PUBLICATIONS

Robert E. Sheriff, Encyclopedic Dictionary of Exploration Geophysics, Society of Exploration Geophysicists, Tulsa, Oklahoma, 1975, pp. 127, 128, 205, and 212.
J. A. Coffeen, Exploration Fundamentals, PPC Book, Tulsa, Oklahoma, 1978, pp. 51, 54–56.
Sheriff, Exploration Geophysics Encyclopedia Dictionary, 1/23/75, p. 143.
Davis, James M., Interpretation of Velocity Spectra through an Adoptive Modeling Strategy, Geophysics, vol. 37, No. 6, 12/72, pp. 953–962.
Hilterman, Fred J., Three Dimensional Seismic Modeling, Geophysics, vol. 35, No. 6, 12/70, p. 1020-10-37.
Rumbold, J. G., Jackin, a New Approach to Calibrating, 39th National Fall Conference, 10/15-18/79, pp. 459-461.

Primary Examiner—Charles T. Jordan
Assistant Examiner—Brian Scott Steinberger
Attorney, Agent, or Firm—Timothy D. Stanley

[57] ABSTRACT

Seismic signals are processed to determine relative location error. In a further aspect, the relative location errors are corrected and the corrected seismic signals are processed to give information on subsurface structure.

24 Claims, 7 Drawing Figures

METHODS OF PROCESSING GEOPHYSICAL DATA AND DISPLAYS OF GEOPHYSICAL DATA

This is a continuation of copending application Ser. No. 231,699, filed Feb. 5, 1981, now abandoned.

FIELD OF THE INVENTION

The invention relates to methods of processing geophysical data and to displays of the processed data. In one aspect, the invention relates to the processing and display of data obtained by seismic methods.

BACKGROUND OF THE INVENTION

In seismic prospecting, an acoustic or seismic wave energy source is positioned either on the surface or in the subsurface of the earth, or is towed a predetermined distance beneath the surface of a body of water. A seismic source signal of some preselected waveshape and energy content is generated by the seismic energy source. The energy generated by the source penetrates through the layers of material comprising the subterranean portion of the earth in the region being prospected. Since the energy propagates at different speeds in each layer of material, refractions, reflections, and diffractions of the seismic energy occur at each layer. These energy reflections, refractions, and diffractions cause secondary seismic energy signals to return toward the surface of the earth. At the surface, the returning seismic signals are detected by a plurality of geophones, hydrophones, or seismic detectors spaced in a geometric array. The detectors generate electrical signals in analog or digital form which are representative of the amplitude of the reflected, refracted, and diffracted seismic energy signals arriving at the detectors.

The seismic signals can then be recorded in the field in analog or digital form and transmitted to a data processing center for further processing or can be further processed directly in the field. The further processing can involve, for example, writing source and receiver location data into each seismic record, filtering to remove undesired noise, gain correction, editing to remove undesirable traces, deconvolution, common depth point (CDP) sorting, corrections for normal moveout, corrections for statics, and the like.

The source-detector configurations for the generation and collection of seismic data include configurations for two-dimensional and for three-dimensional seismic prospecting. A configuration for two-dimensional seismic prospecting typically has the detectors arrayed along a line so that a detector location can be determined by the position of the detector in the line. A configuration for three-dimensional seismic prospecting typically has the detectors arranged in a configuration which would require, to determine the location of each detector, specifying two values, for example, an X and a Y coordinate, or longitude and latitude, etc.

Conventional two-dimensional seismic exploration techniques are relatively insensitive to error in the location of the seismic sources and receivers, hereafter location error. This relative insensitivity to location error results because seismic sources and receivers are, as indicated, typically located along a seismic line so that only locations along the line are required and these locations are relatively easy to determine using, for example, a surveying chain.

In three-dimensional seismic exploration techniques now in use and being developed, an accurate knowledge of the positions of the seismic sources and detectors used during the acquisition of the seismic data is a requirement. These locations are required for processing of the seismic signals, and further, as indicated, both X and Y coordinates (or latitude and longitude, etc.) of the source and detector locations must be known to properly process, for example, to stack and migrate and otherwise process the recorded seismic data. Location errors in the positions of the seismic sources and detectors can seriously degrade the quality of the resulting seismic images of the subsurface.

Location errors can occur or develop in a number of ways. Some possibilities include, for example, (1) surveying errors; (2) incorrect estimation of missing station locations after station flags are destroyed; (3) communication errors between shooter and observer concerning what source point is being initiated; (4) processing errors; and (5) bookkeeping errors anywhere along the surveyor-driller-shooter-observer-processor sequence.

Accordingly an object of the invention is a method for determining relative location errors of a seismic record.

A further object of the invention is a method for determining and correcting relative location errors of a seismic record.

Other objects of the invention are such methods applied to seismic records comprising data obtained from three-dimensional seismic prospecting.

Yet other objects are displays of seismic data in which relative location errors are displayed and/or corrected.

Further objects and advantages of the invention will be apparent to persons in the art from the following disclosure and the drawings.

SUMMARY

Broadly, the invention comprises comparing a modeled event to an actual event representative of relative location to determine relative location error.

Thus, according to the invention is means and method for processing one or more seismic signals to determine relative location error comprising generating one or more first signals representative of a selected event representative of relative location according to a model of the selected event and determining relative location error by comparing one or more first signals with one or more second signals representative of the selected event as represented in the one or more seismic signals.

Further according to the invention is means and method for processing one or more seismic signals to determine relative location error comprising generating one or more first signals representative of a selected event in the seismic signal according to a model of the selected event, placing the thus generated first signals in or on the seismic signals, and displaying the resulting set of seismic signals in a seismographic display.

Further according to the invention is means and method for processing one or more seismic signals comprising generating for each of the one or more seismic signals a first signal representative of a selected event in the seismic signal according to a model of the selected event, comparing one or more of the first signals with one or more second signals representative of the selected event as represented in the one or more seismic signals, producing a signal representative of relative location error, and correcting the seismic signals according to the signal representative of relative location error to reduce relative location error distortion in seismic images produced using the seismic signals.

Other aspects of the invention will be appreciated by those in the art from the following detailed description and the drawings.

DETAILED DESCRIPTION OF THE INVENTION

Figure 1A:
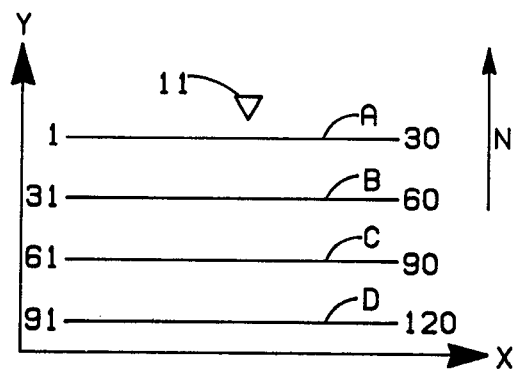
FIG. 1(A) is a schematic representation of a first configuration for seismic exploration.

According to the invention, a seismic signal is processed to determine and/or display and/or correct relative location error. Each seismic signal is dependent upon source location and receiver location as well as upon subsurface propagation, reflection, refraction, and diffraction of the seismic signal. The location of each receiver can be defined relative to a source, or conversely the location of each source can be defined relative to the receivers, i.e., sources and receivers have "relative location". Sources and receivers also have what can be called absolute location, for example, defined by longitude and latitude, and the like. The method according to the invention is useful for determining relative location error; i.e., error in specifying the location of sources relative to receivers or vice versa. A consequence of the fact that the method is useful for determination of relative location error is that in practicing the method of the invention it is necessary to assume that the source location or the receiver location(s) for a given seismic signal is correct. As a practical matter, errors in source relative location in a configuration for seismic exploration can occur more frequently than errors in receiver relative location. Consequently, in the description of the illustrated embodiments herein it is assumed that receiver location is correct and source relative location error is determined. However, the principles herein described also apply when it is assumed source location is correct to determine receiver relative location error.

The seismic signal which can be processed using the method of the invention can be any seismic signal which contains an event representative of relative location. Practically speaking, it is preferable to process seismic signals according to the invention before such conventional processing as normal moveout corrections, common depth point sorting, and the like have been applied to the signals because such processing makes more difficult the determination, and correction, of relative location error even though such error determination and correction remain possible in principle. Preferably the seismic signal is a seismic signal such as is received in the field or recorded in the field following a seismic initiation. For purposes of describing the illustrated embodiment, the seismic signals are seismic records obtained in the field and processed in a processing center as a common-source record. However, direct processing in the field is also possible, as is processing of common receiver records, and many other variations which one skilled in the art can appreciate.

According to the invention, one or more first signals representative of a selected event according to a model is compared with one or more second signals representative of the selected event in the one or more seismic traces to determine relative location error. The selected event must be representative of relative location and can be any event in the seismic record for which a signal can be produced according to a model of the event. The model can be a physical model or a mathematical model. Preferably, the model is a mathematical model because such models are readily amenable to seismic data processing procedures.

According to the preferred embodiment, the event representative of relative location is a time event, specifically first arrival time. The principles are applicable to first arrival time of direct, reflected, refracted, and diffracted waves although in the preferred embodiment refracted waves are involved.

First arrival time can be approximated by the formula $$T = \frac{D}{V} \quad (1)$$

where
T is the first arrival time;
D is the source-receiver offset distance; i.e., the distance between the source and the respective receiver or detector; and
V is a velocity equal to the velocity of the seismic first arrival, for example, in the illustrated embodiment, refraction break. This velocity is assumed constant in the three-dimensional survey area.

Frequently, the value of V will be known from previous seismic exploration of the area. It is, however, also possible to determine V, for example, by including in the data, data derived from initiating a seismic source located in a line of detectors (conventional b 2-dimensional seismic prospecting) to give V for the remaining seismic exploration of the area whether 2-dimensional or 3-dimensional. A third way of determining V is by including V as the third unknown in a program to determine x-coordinates and y-coordinates of sources or receivers and solving by mathematical and computational techniques now available. The method by which V is determined, however, is not to be considered to limit the present invention which can be used with any suitable method for determining V.

Other formulas and models for approximating first arrival time which are representative of relative location can of course also be employed.

According to the invention, a first arrival time according to a model is compared to an actual first arrival time of one or more seismic signals to determine relative location error. In one illustrated embodiment, this comparison is carried out as follows.

As a part of processing seismic records for use, source and receiver locations can be input to a program which writes the appropriate source and detector, x, y coordinates, longitude, latitude or the like into the trace header for each seismic trace that was recorded. Using these coordinates, such a program can also write the distance between the source and the receiver ("source detector offset distance" or "D" in equation (1) above) into each trace header. Developing such programs is a routine part of seismic data processing and will not be further described. In the illustrated embodiment the traces preferably have such information in the trace header. Having such information in the trace header is not necessary for the practice of the invention but is one aspect of the invention which may be practiced in a number of ways readily devised by one skilled in seismic data processing.

According to the invention first signals are generated representative of first arrival time. In a preferred embodiment respective first signals are inserted into or superimposed upon each seismic signal at a time given according to the model of equation (1). To facilitate clarity in a seismographic display, the signals can be placed in the seismic signal by time-delaying each seismic record by a fixed amount, for example, 200 milliseconds (msec) to put a zone of zeroed signal at the start of each trace and by adding a first signal pulse to each seismic signal at a time according to the model of equation (1) described above. The method according to the invention can be profitably applied to a single seismic signal provided the user has confidence in the knowledge of subsurface velocity V. Preferably, however, the method is applied to more than one seismic signal to allow for variations in subsurface velocity which can occur. In a preferred embodiment, after a first signal is placed in each seismic signal, each common-source record can then be plotted to produce a seismographic display, using, for example, a conventional seismic plotter. The first signal pulses added to each seismic signal form a pattern when examined over many traces of a common-source record which is indicative of relative location error. In the absence of relative location error, the first signal pulses pattern will track the pattern formed by the first arrival pattern by a generally constant time difference approximately equal to the time delay, if any, that was applied to the seismic trace records, in the illustrated embodiment, 200 msec. If the first signal pulses pattern tracks the first arrival events pattern by a generally constant time difference, then no relative location error is indicated; and the described position of the source relative to the spread of receivers or detectors is probably correct. If the first signal pulse pattern does not track the first arrival pattern, then either the described source position or the described detector positions are indicated to be incorrect provided that the model, including, for example, velocity V determination in equation (1) above, is reasonably accurate. The failure to track is because the time of the first break event can be approximately described by the model of equation (1) above where D is the actual source-receiver offset distance.

FIG. 1, FIG. 2, and FIG. 3 illustrate this aspect of the invention through an example.

EXAMPLE

Figure 1B:
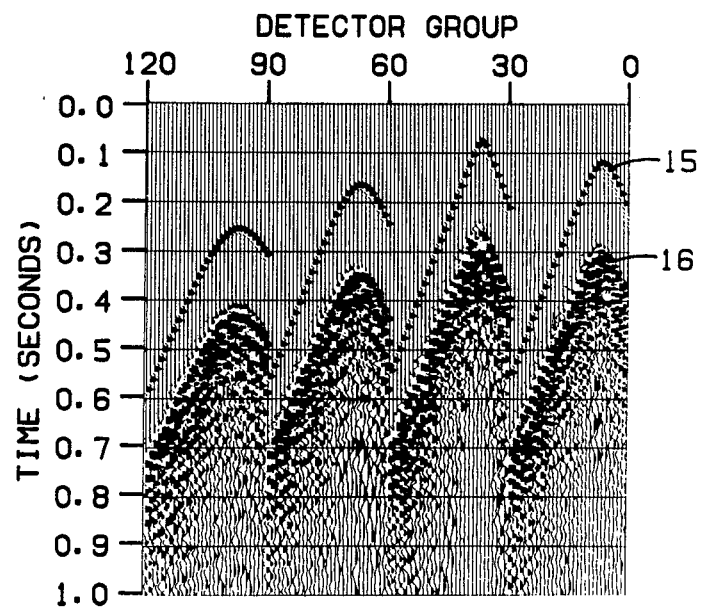
FIG. 1(B) is a plot of data obtained from the configuration of FIG. 1(A).
Figure 2A:
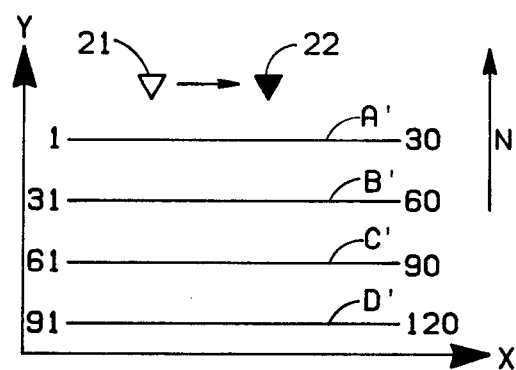
FIG. 2(A) is a schematic representation of a second configuration for seismic exploration.
Figure 2B:
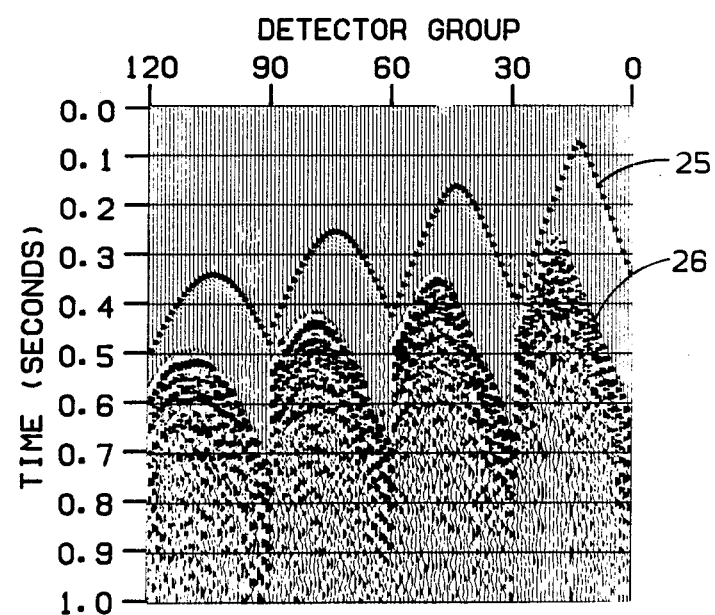
FIG. 2(B) is a plot of data obtained from the configuration of FIG. 2(A).
Figure 3A:
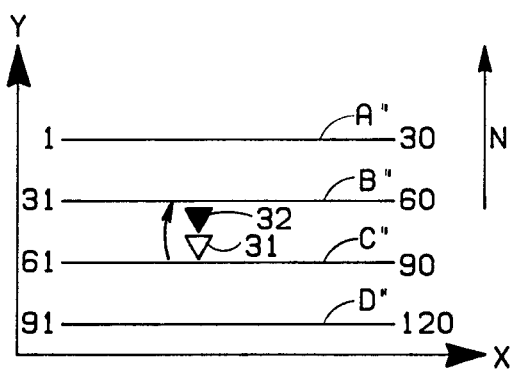
FIG. 3(A) is a schematic representation of a third configuration for seismic exploration.
Figure 3B:
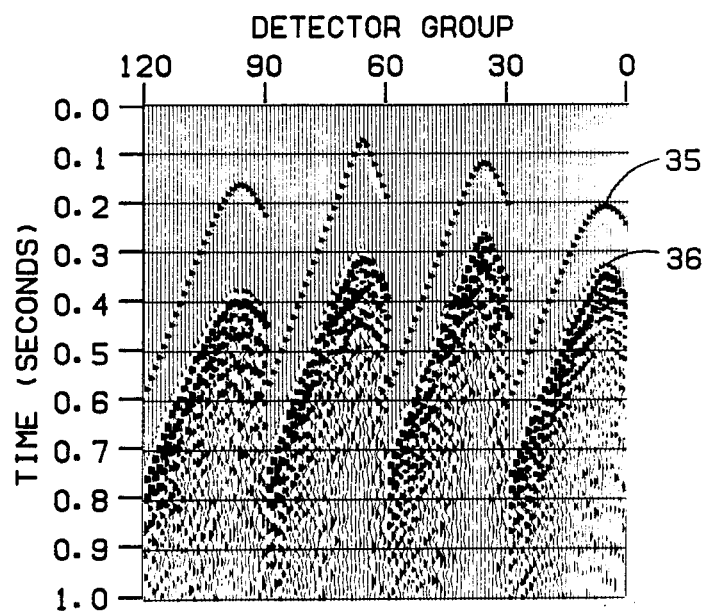
FIG. 3(B) is a plot of data obtained from the configuration of FIG. 3(A).

The data of FIGS. 1(B), 2(B), and 3(B) were recorded in a common-source record from a seismometer array as set forth in FIGS. 1(A), 2(A), and 3(A), respectively with 200 foot spacing between detector groups and 800 ft intervals between lines of detectors. The seismometers were Geospace Corporation Seismometers Model GSC-20D with each detector group comprising twelve seismometers laid in a linear array along the seismometer line. The recording system was a 120-channel DFS-V available from Texas Instruments. The source was dynamite. The retraction velocity V for the area prospected is known from previous exploration to be about 900 ft/sec.

FIG. 1A is a schematic representation of a configuration for three-dimensional seismic prospecting having four parallel east-west lines A, B, C, D, of detectors and having a seismic source at reference numeral 11. Each line or spread has 30 detectors as indicated by the numbers at the ends of each line so that a total of 120 seismic traces are recorded for each seismic initiation. FIG. 1(B) shows the first signal pulse pattern 15 and the first arrival pattern 16 wherein the first signal pulse pattern 15 tracks the first arrival pattern 16 by a generally constant offset of about 200 msec.

FIG. 2(A) is a schematic representation of an array as in FIG. 1(A) having the lines of detectors designated A', B', C', D'. The recorded source location is represented at reference numeral 21 whereas the actual source location as determined according to the invention is at reference numeral 22; i.e., there is source location error in the x dimension. FIG. 2(B) shows the first signal pulse pattern 25 and the first arrival pattern 26 for such an array. In this case, the error in the X-coordinate of the source has caused a shift in the x-dimension (detector group number) of the first signal pulse pattern relative to the first arrival pulse pattern. The amount of error in the x-dimension is equal to the number of traces which the first signal pulse pattern is shifted in the x-direction times the spacing between detectors. In this case, the error has shifted the pattern five (5) traces and assuming an average spacing of 200 ft between detectors the x-dimension error is 1000 ft. The determined error can be used to correct the seismic signals, for example, by inputting the x-dimension error to a program which will write the corrected x-dimension source position indicated by reference numeral 22 in the header for each trace of a common source record. The corrected records can then be further processed in any appropriate manner.

FIG. 3(A) is a schematic representation of an array as in FIG. 1(A) having the lines of detectors designated A", B", C", D". The recorded source location is at reference numeral 31 whereas the actual source location is at reference numeral 32; i.e., there is source location error in the y-dimension or time dimension. FIG. 3(B) shows the first signal pulse pattern 35 and the first arrival pattern 36 for the array of FIG. 3(A). The first signal pulse pattern indicates that the source is nearest the detector row consisting of receivers 61–90 whereas the first arrival signal pattern indicates that the source is nearest the detector row consisting of receivers 31–60. The x coordinate of the source is indicated to be correct since there is no shift in the x-direction of the first signal pulse pattern relative to the first arrival pattern. Y-coordinate error can be determined by measuring the time difference ($\Delta t$) between corresponding apexes on the first signal pulse pattern 35 and on the first arrival pattern 36. At the apexes, the x-coordinates of the source and the detector are the same, facilitating determination of y-coordinate error. In practice, determination of y-coordinate error is most easily accomplished by measuring the time difference ($\Delta t$) between the modeled time of first arrival and the recorded time of first arrival. In the event that the first pulse pattern has been shifted in time from the first arrival pattern by, for example, inserting a time delay at the start of each trace, then the time difference $\Delta t$ of interest will be given by $$\Delta t = \Delta t_{observed} - t_{delay}$$

when $t_{delay}$ is the interval by which the traces are delayed, in the illustrated embodiment 200 msec. The y coordinate error is then given by $$\Delta y_{error} = \Delta t \, V$$

where V is known as described above.

In the above-described example, the effect of relative source location error in the x-dimension and in the y-dimension are separable because the seismometer spreads are parallel to the x-axis. If the spreads are oriented skew to the x, y coordinate system relative location errors are still detectable but less easily separable since either x or y location error will cause both a shift and a distortion of the first pulse pattern relative to the first break pattern. This coupling of the two effects can be eliminated during seismic data processing by performing a rotation of coordinates from the x, y coordinates to a set of coordinates x', y' having x' oriented parallel to the seismometer spreads. Errors in x', y' of the location coordinates are then separately detectable and an inverse rotation back to x, y coordinates will give the error in x, y coordinates of the source point.

Figure 4:
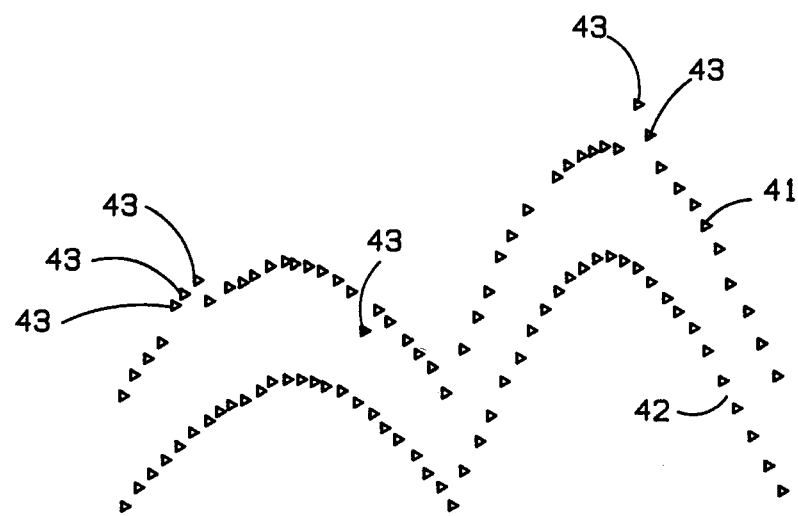
FIG. 4 is a schematic representation according to one aspect of the invention of a first signal pattern and an event pattern showing isolated detector group error.

Further according to the invention relative location errors of the detectors in a common-source record, for example, are also determinable. According to the illustrated embodiment, of course, a constant error in the coordinates of an entire seismometer (detector) spread is indistinguishable from a source location error because the formula used in approximating first arrival time depends on the source-receiver offset distance; i.e., the difference of the source and receiver coordinates. Nevertheless, errors in the coordinates of a relatively small number of detectors are determinable as isolated departures from the tracking by the first signal pattern of the first arrival pattern. This situation is illustrated in FIG. 4 wherein reference numeral 41 refers to the first arrival pattern, reference numeral 42 refers to the first signal pulse pattern and reference numerals 43 refer to detectors having erroneous position descriptions.

As illustrated by the above description, relative location errors in, for example, a common source record, can be detected by the method of the invention. Further, according to the invention, the relative location errors can be corrected to within an accuracy tolerable for seismic exploration by analysis of first signal pulse pattern and first arrival pattern combined with a knowledge of the seismic array geometry and dimensions. The displays produced by practicing the method of the invention are also within the scope of the invention.

Further, according to the invention, however, is a method for processing seismic data in which no display need necessarily be generated before processing the corrected seismic data. According to this aspect of the invention, the recorded source and receiver location data are used to model the selected event. The modeled event is compared to the actual event in the seismic signal(s), an error signal representative of error in source location generated, and the generated error signal is used to correct the source and receiver location data. This can be readily accomplished by one skilled in the art by, for example, computer simulation of the method set forth above for determining and correcting location data errors. Thus, for example, the coordinates can be rotated as described above, if necessary. Errors in x- and y-coordinates can the be calculated as described and used to correct the location data, again with an inverse rotation of coordinates if necessary. Other methods, such as, for example, those involving the use of least square minimization can, of course, also be used and these techniques being in common use and familiar to those skilled in the art need not be further described.

The process of the present invention can be carried out using ananlog computing systems or digital computing systems. In the illustrated embodiment, a field recorder is used to record the seismic signals in the field and a conventional general purpose digital computer is utilized to carry out the process of the present invention on the recorded signals. One particular computing system which is suitable for use is International Business Machines IBM 370/168 with associated input/output devices and a particular plotter is a Geospace Model 3400 plotter. The apparatus of the invention comprises such analog computing systems and digital computing systems which have been configured or programmed to carry out the invention. Such configuration and programming as would be required to do this are routine to persons in the art who are familiarized with the invention and need not be further described.

It will be readily appreciated that the method and displays of the invention can be used to improve seismic data and to permit data to be used which would otherwise be omitted. Practice of the invention can produce, for example, improved determination of static corrections, improved determination of CDP stacking velocities, improved coherency of CDP stacking, consequently improved displays of migrated image of subsurface structure, and the like, and is easily implemented. Although the invention has been described in terms of preferred embodiments, however, the invention is not to be limited by the illusrated embodiments but by the claims appended hereto.

That which is claimed is:

1. A method for processing one or more seismic signals to determine error in specifying the locations of sources relative to receivers comprising:
   generating one or more first signals having a selected first time pulse event representative of assumed locations of sources relative to receivers according to a model of the assumed locations of sources relative receivers; and
   determining error in specifing the assumed locations of sources relative to receivers by comparing one or more of said signals with one or more seismic signals having a second time pulse event representative of the location of sources relative to receivers.

2. A method as in claim 1 wherein:
   the first time pulse event is first arrival time; and
   the second time pulse event is representative of the first arrival time of the one or more seismic signals.

3. A method as in claim 1 wherein:
   the first time pulse event is generated according to:

$$T = D/V$$

where
   T = arrival time of signal time pulse event;
   D = assumed offset distance between seismic sources and receivers; and
   V = velocity of seismic signal time pulse event.

4. A method as in claim 1 wherein:

each of the one or more seismic signals has a trace header on which data representative of assumed relative locations are recorded.

5. A method as in claim 4 further comprising:
correcting the data representative of the assumed relative locations in said trace header by at least one amount representative of error in specifyiing the locations of sources relative to receivers of a respective trace to produce a trace having corrected relative location data.

6. A method for processing one or more seismic signals to determine error in specifying the locations of sources relative to receivers comprising:
generating one or more first signals having a time pulse event representative of relative location between sources and receivers according to a model of the assumed location of sources relative to receivers;
placing the thus generated first signals in the respective seismic signals; and
displaying the resulting set of seismic signals and first signals in a seismographic display.

7. A method as in claim 6 wherein:
the time pulse event is first arrival time, and is representative of the first arrival time of a time pulse event on the one or more seismic signals.

8. A method as in claim 6 wherein:
the seismic signal is delayed for a predetermined interval to place a zone of zeroed signal at the start of each seismic signal; and
the first signal is an electrical pulse which is inserted into said seismic signal at a time given by the model for each respective seismic signal.

9. A method as in claim 6 wherein:
each of the one or more seismic signals has a trace header on which data representative of assumed relative location are recorded.

10. A method as in claim 9 further comprising
correcting the data representative of the relative location in said trace header by at least one amount representative of error in specifying the location of sources relative to receivers of a respective trace to produce a trace having corrected relative location data.

11. A method as in claim 1 further comprising:
further processing the one or more seismic traces to produce a seismogram representative of subsurface structure of the area being prospected.

12. A display produced according to the method of claim 6.

13. A display produced according to the method of claim 11.

14. A method for determining error in assumed seismic source and receiver relative locations comprising:
recording a measure of the seismic source and receiver assumed absolute locations;
generating a signal time pulse event representative of the seismic source and receiver assumed relative locations from said measure of the seismic source and receiver assumed absolute locations;
generating a seismic signal with the receiver in response to seismic energy imparted into the earth with the seismic source having a time pulse event representative of seismic source and receiver relative locations; and
determining relative location error in the seismic source and receiver assumed relative locations by comparing said signal time pulse even with said seismic signal time pulse event.

15. A method of claim 14 further including:
correcting said recorded measure of the assumed absolute locations of the seismic source with said relative location error.

16. The method of claim 14 further including:
correcting said recorded measure of the assumed absolute locations of the seismic receiver with said relative location error.

17. The method of claim 14 further including:
compensating for said relative location error in seismic traces representative of the seismic signal.

18. An apparatus for processing seismic signals to determine error in assumed locations of seismic sources relative to receivers, comprising:
(a) means for generating a signal having a time pulse event representative of assumed offset distance between seismic sources and receivers according to a model of the assumed locations of seismic sources and receivers;
(b) means for determining offset distance between seismic sources and receivers from seismic signals generated with the receiver in response to seismic energy imparted into the earth with the seismic source having a time pulse event representative of the offset distance between seismic sources and receivers according to the model; and
(c) means for determining error in the assumed offset distance betwen seismic sources and receivers by comparing the signal time pulse event with the seismic signal time pulse event.

19. The apparatus of claim 18 wherein (a) comprises means for generating a signal having a time pulse event according to:

$$T=D/V$$

where
$T$ = arrival time of signal time pulse event;
$D$ = assumed offset distance between seismic sources and receivers; and
$V$ = velocity of seismic signal time pulse event.

20. The apparatus of claim 19 wherein (b) comprises means for determining the offset distance between the seismic sources and receivers according to:

$$D'=T'\cdot V$$

where
$D'$ = offset distance between the seismic sources and receivers;
$T'$ = arrival time of seismic signal time pulse event; and
$V$ = velocity of seismic signal time pulse event.

21. The apparatus of claim 20 wherein (c) comprises means for determining error in the assumed offset distance between seismic sources and receivers according to:

$$\Delta D=\Delta T\cdot V$$

where
$\Delta D$ = difference in the assumed offset distance between seismic sources and receivers and D is the offset distance between seismic sources and receivers D'; and ΔT = difference in arrival times of signal time pulse event T and seismic signal time pulse event T'.

22. The apparatus of claim 18 further including means for correcting the assumed offset distance according to the error determined in the assumed offset distance between seismic sources and receivers.

23. The apparatus of claim 18 further including means for displaying the resulting set of signal time pulse events and seismic signal time pulse events as shown in FIG. 1(*b*).

24. The apparatus of claim 18 further including means for offsetting the signal time pulse event a predetermined amount; and means for displaying on a seismographic display the seismic signal time pulse event and the offset signal time pulse event.

* * * * *

UNITED STATES PATENT OFFICE
CERTIFICATE OF CORRECTION

PATENT NO. : 4,592,032
DATED : May 27, 1986
INVENTOR(S) : Gary M. Ruckgaber

It is certified that error appears in the above-identified patent and that said Letters Patent are hereby corrected as shown below:

Column 4, line 44, delete "b".

Column 6, line 4, "900" should read --9000--.

Column 8, line 8, "ananlog" should read -- analog --.

Column 10, line 1, "even" should read -- event --.

Signed and Sealed this

Nineteenth Day of January, 1988

Attest:

DONALD J. QUIGG

Attesting Officer

Commissioner of Patents and Trademarks